United States Patent Office 2,983,754
Patented May 9, 1961

2,983,754
METHOD OF PREPARING DODECAHYDRO-PHENANTHRENE COMPOUNDS
Norman L. Wendler, Summit, N.J., assignor to Merck & Co., Inc., Rahway, N.J., a corporation of New Jersey
No Drawing. Filed Jan. 24, 1955, Ser. No. 483,819
10 Claims. (Cl. 260—514.5)

This invention relates to novel dodecahydrophenanthrene compounds and processes of preparing the same. Specifically, it is concerned with $\Delta^2$-1-carboxyethyl-2,4b$\beta$ - dimethyl-4-keto-7$\alpha$-hydroxy-4a$\alpha$,8a$\beta$,10a$\beta$-dodecahydrophenanthrene, $\Delta^2$-1-carboxypropyl-2,4b$\beta$-dimethyl-4-keto-7$\alpha$ - hydroxy - 4a$\alpha$,8a$\beta$,10a$\beta$ - dodecahydrophenanthrene and derivatives thereof and with new intermediate products and processes useful in the preparation of these dodecahydrophenanthrene compounds.

In accordance with this invention it is now found that dodecahydrophenanthrene compounds having the structural formula

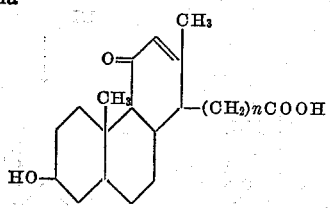

wherein $n$ is 2 or 3, which are valuable products useful in the preparation of steroids such as aldosterone and the like, can be prepared by reacting compounds having the structural formula

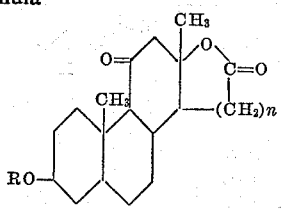

wherein $n$ is the same as above, and R is hydrogen or acyl with a base.

It is an object of the present invention to provide a process for the preparation of novel $\Delta^2$-1-carboxyethyl or carboxypropyl - dodecahydrophenanthrene compounds. Another object is to provide $\Delta^2$-1-carboxyethyl-2,4b$\beta$-dimethyl-4-keto - 7$\alpha$-hydroxy-4a$\alpha$,8a$\beta$,10a$\beta$-dodecahydrophenanthrene, $\Delta^2$-1-carboxypropyl-2,4b$\beta$-dimethyl-4-keto-7$\alpha$-hydroxy-4a$\alpha$,8a$\beta$,10a$\beta$-dodecahydrophenanthrene, and derivatives thereof convertible thereto by hydrolysis. A further object is to provide novel compounds useful as intermediates in the preparation of these $\alpha,\beta$-unsaturated acids. These and other objects of my invention will be apparent from the detailed description hereinafter provided.

In accordance with one embodiment of my invention, it is now found that the new dodecahydrophenanthrene compounds of my invention can be prepared by reacting lactones having the structure

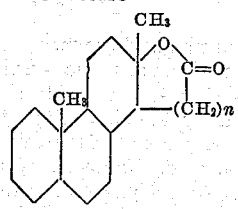

wherein $n$ is 2 or 3 with a base. The lactone employed as the starting material in my process can be saturated or unsaturated and can contain other substituents such as alkyl, hydroxy, keto, acyloxy, and the like.

The desired $\alpha,\beta$-unsaturated acids are produced by reacting the starting lactone with a strong, inorganic base such as alkali metal hydroxides or carbonates, alkaline earth metal hydroxides, alkali metal alkoxides, and the like. Generally, I prefer to effect the reaction in the presence of a suitable inert solvent for the lactone such as a lower aliphatic alcohol. The reaction is most conveniently effected by heating a methanol solution of the lactone with an alkali metal hydroxide, for example, sodium or potassium hydroxide, or with an alkali metal alcoholate, for example sodium methylate or potassium ethylate. After the reaction is complete, the desired $\alpha,\beta$-unsaturated acid can be readily recovered by acidifying the reaction mixture, concentrating the resulting solution to dryness, dissolving the residue in ethyl ether, and concentrating the resulting solution.

The process of the present invention is particularly useful in preparing $\Delta^2$-1-carboxyethyl-2,4b$\beta$-dimethyl-4-keto - 7$\alpha$ - hydroxy - 4a$\alpha$,8a$\beta$,10a$\beta$ - dodecahydrophenanthrene and $\Delta^2$-1-carboxypropyl-2,4b$\beta$-dimethyl-4-keto-7$\alpha$-hydroxy-4a$\alpha$,8a$\beta$,10a$\beta$-dodecahydrophenanthrene, which, as will be pointed out in detail hereinafter, are very useful in the preparation of valuable steroid compounds. These products are produced by the hydrolysis of 3$\alpha$-hydroxy - 11 - keto - etiochololactone or acyl derivatives thereof, and 3$\alpha$-hydroxy-11-keto-D-homoetiochololactone or its acyl derivatives respectively.

The novel dodecahydrophenanthrene compounds of the present invention can be readily converted into useful derivatives thereof such as esters in accordance with methods known in the art. Thus, these compounds can be acylated to form the corresponding 3-acyloxy compounds. For example, the dodecahydrophenanthrene compounds can be reacted with acetic anhydride in the presence of pyridine to form the corresponding 3-acetoxy compounds, or with benzoyl chloride to produce the corresponding 3-benzoxy derivative. Also, the dodecahydrophenanthrene compounds, or the 3-acyloxy derivatives thereof, can be readily esterified, for example, by reaction with an alcohol in the presence of a small amount of an acid, to obtain the corresponding dodecahydrophenanthrene compound having an esterified carboxylic acid group.

In accordance with another embodiment of my invention, it is now found that $\Delta^2$-1-carboxyethyl-2,4b$\beta$-dimethyl - 4 - keto - 7$\alpha$ - hydroxy - 4a$\alpha$,8a$\beta$,10a$\beta$-dodecahydrophenanthrene can be prepared from 3$\alpha$-hydroxy-11,17-diketoetiocholane by the process which can be shown as follows:

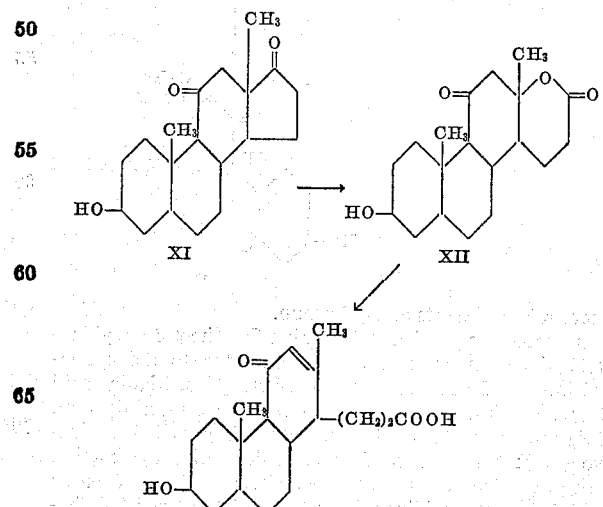

In this process the starting material, 3$\alpha$-hydroxy-11,17-diketo-etiocholane (XI) is reacted with an organic per acid to produce 3α-hydroxy-11-keto-etiochololactone (XII) which on treatment with a base is converted to the desired dodecahydrophenanthrene compound.

Alternatively, in the above process, the intermediate etiochololactone (XII) can be acylated to produce the 3-acyloxy derivative which can then be converted to the dodecahydrophenanthrene compound by reaction with a base.

Pursuant to a further embodiment of my invention, I have found that Δ²-1-carboxypropyl-2,4bβ-dimethyl-4-keto - 7α - hydroxy - 4aα,8aβ,10aβ - dodecahydrophenanthrene can be prepared from 3α-acetoxy-11,17-diketo-etiocholane by the process which can be shown as follows:

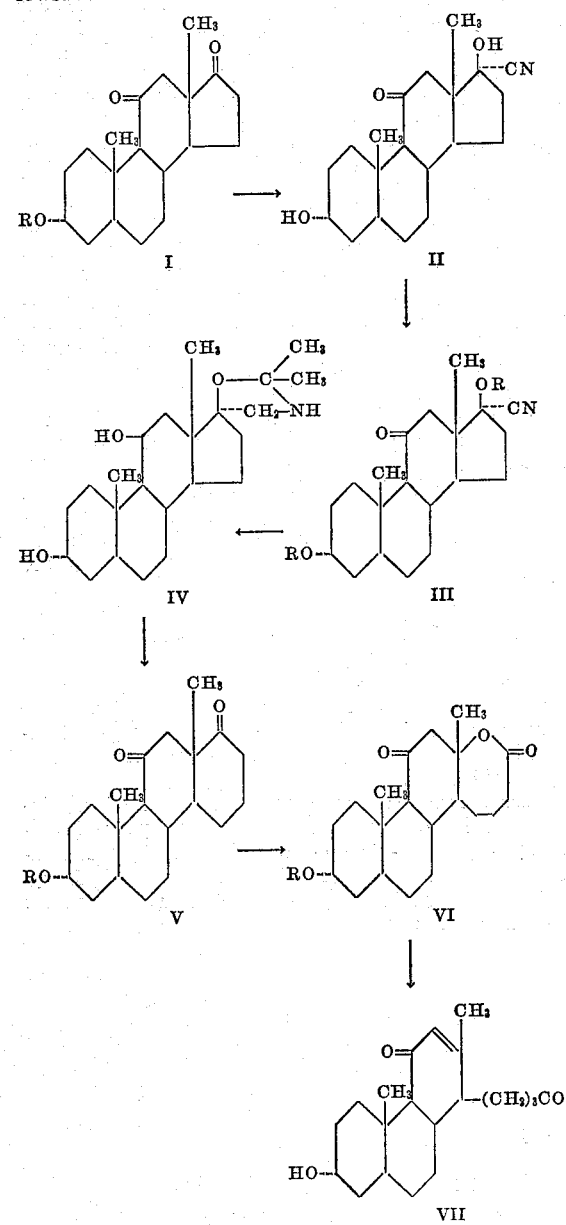

wherein R represents an acyl group.

In accordance with the foregoing flowsheet 3α-acyloxy-11,17-diketo-etiocholane (I) is converted to the cyanohydrin, of 3α-17β-dihydroxy-11-keto-17-isoetianic acid (II); acylation of this compound by reaction with an acylating agent forms the corresponding diacyl derivative (III); reduction of the diacyl derivative by reaction with lithium aluminum hydride and reaction with acetone yields the oxazolidine derivative of 3α,11β,17β-trihydroxy-20-amino-norpregnane (IV); diazotization of this amine by reaction with sodium nitrite in aqueous acetic acid and acylation of the resulting product followed by oxidation with chromic acid affords 3α-acyloxy-11,17α-diketo-D-homoetiocholane (V); oxidation of this compound with an organic per acid produces 3α-acyloxy-11-keto-D-homoetiochololactone; and treatment of this lactone with a strong base affords Δ²-1-carboxypropyl-2,4bβ - dimethyl - 4 - keto - 7α - hydroxy - 4aα, 8aβ, 10aβ-dodecahydrophenanthrene (VII).

Alternatively, the desired dodecahydrophenanthrene compound can also be prepared using 3α,17α-dihydroxy-11,20-diketo-21-acyloxy-pregnane as the starting material by the following reactions:

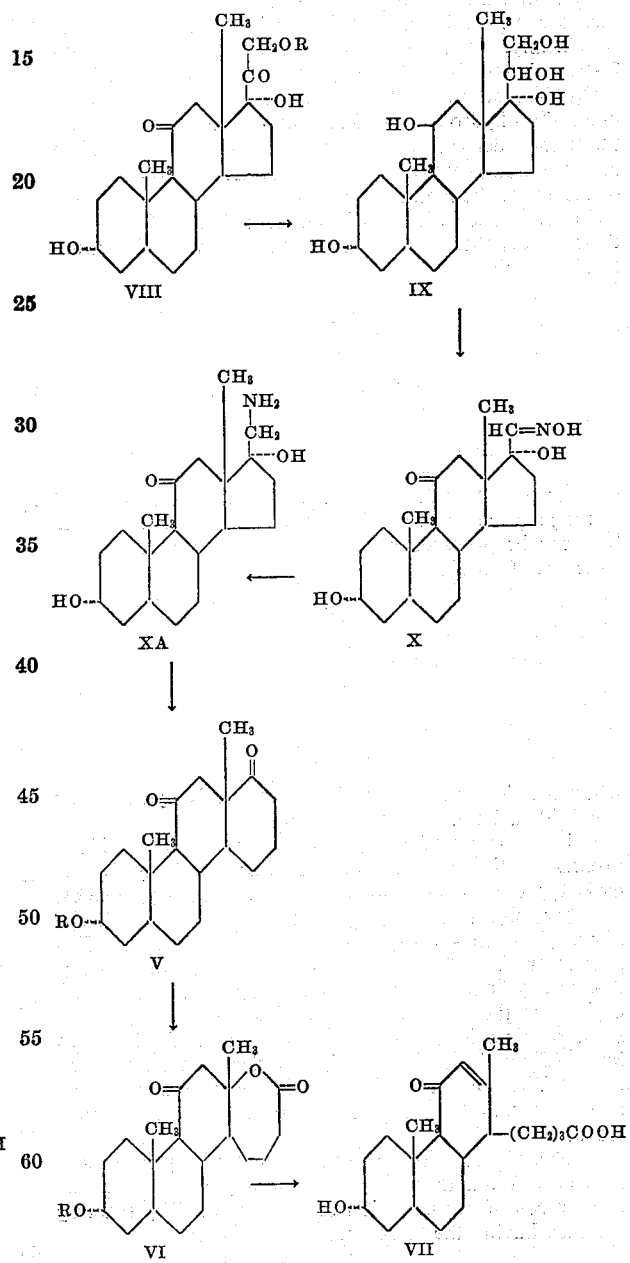

wherein R represents an acyl group.

In this series of reactions, the starting material, 3α, 17α - dihydroxy - 11,20 - diketo - 21 - acyloxy - pregnane (VIII) is reduced by reaction with lithium aluminum hydride to form the pentol (IX); treatment of this compound with periodic acid followed by treatment of the resulting reaction product yields the oxime (X); and reduction of the oxime with hydrogen in the presence of a noble metal catalyst affords 3α,11β,17α-trihydroxy-20-aminonorpregnane; diazotization of this amine by reaction with sodium nitrite in aqueous acetic acid and acylation of the resulting product followed by oxidation with chromic acid gives 3α-acyloxy-11,17α-diketo-D-homoetiocholane (V). This compound is then converted to Δ² - 1 - carboxypropyl - 2,4bβ - dimethyl - 4 - keto-7 - hydroxy - 4aα,8aβ,10aβ - dodecahydrophenanthrene as described above.

In the above-described methods for the preparation of Δ² - 1 - carboxypropyl - 2 - 4bβ - dimethyl - 4 - keto-7α - hydroxy - 4aα,8aβ,10aβ - dodecahydrophenanthrene, although any acyl group can be utilized for the purpose of protecting the hydroxy substituents, I have found it to be particularly advantageous to employ lower fatty acid acylating agents for this purpose. Generally, I prefer to use an acetyl group for the protection of the hydroxy substituents, since these derivatives are most conveniently prepared.

The novel dodecahydrophenanthrene compounds obtained in accordance with the present invention are useful as intermediates in the preparation of valuable steroid compounds. Thus, Δ² - 1 - carboxyethyl - 2,4bβ - dimethyl - 4 - keto - 7α - hydroxy - 4aα,8aβ,10aβ - dodecahydrophenanthrene can be converted to the valuable mineral factor of the adrenal cortex as follows:

The Δ²-1-carboxyethyl-2,4bβ-dimethyl-4-keto-7α - hydroxy 4aα,8aβ,10aβ-dodecahydrophenanthrene is acetylated by reaction with acetic anhydride to form the 7α-acetoxy derivative; this derivative is then esterified by reaction with methanol in the presence of HCl to form the corresponding methyl ester; reaction of this methyl ester with N-bromosuccinimide followed by treatment of the reaction product with potassium acetate in acetone and hydrolysis of the resulting reaction product yields Δ²-7α-hydroxy-4-keto-2-(hydroxymethyl) - 4bβ-methyl-4aα,8aβ,10aβ-dodecahydrophenanthryl-1β-propionic acid; oxidation of this product with manganese dioxide and treatment of the oxidized product with methanol in the presence of acid produces Δ²-7α-hydroxy-4-keto-2-(dimethoxymethyl)-4bβ, methyl - 4aα; 8aβ,10aβ-dodecahydrophenanthryl-1β-propionic acid; acetylation of this product with acetic anhydride and treatment of the acetylated product with thionyl chloride affords Δ²-7α-acetoxy-4-keto-2-(dimethoxymethyl) - 4bβ - methyl - 4aα,8aβ,10aβ-dodecahydrophenanthryl-1β-propionic acid chloride; reaction of this compound with diazomethane produces Δ²-7α-acetoxy-4-keto-2 (dimethoxymethyl) - 4bβ - methyl-4aα,8aβ, 10aβ-dodecahydrophenanthryl - β - propiodiazomethyl ketone; treatment of this compound with acetic acid yields 3α, 17α-dihydroxy-11, 17-diketo-18, 18-dimethoxy-D-homoetiocholane; oxidation of this compound with sodium meta-periodate followed by air oxidation and acetylation of the oxidized product with acetic anhydride in the presence of pyridine affords 3α-acetoxy-18,18-dimethoxy-11-keto-etiobilianic acid; esterification of the latter product with methanol in the presence of a small amount of acid and treatment of the esterified product with sodium ethylate results in obtaining 3α-hydroxy-11,17-diketo-18,18-dimethoxy-etiocholane; reaction of this product with potassium acetylide in liquid ammonia followed by catalytic reduction affords 3α,17-dihydroxy-11-keto-18,18-dimethoxy-17-vinyl-etiocholane; bromination of this product with phosphorous tribromide followed by treatment of the brominated product with potassium acetate produces Δ¹⁷-3α-hydroxy-11-keto-18,18 - dimethoxy - 21 - acetoxypregnene; reaction of this product with osmium tetroxide and treatment of the resulting osmate ester with acetic anhydride yields 3α,20,21-triacetoxy-11-keto-17α-hydroxy-18,18-dimethoxy-pregnane; reaction of this product with zinc in toluene and hydrolysis of the resulting product with an alkali affords 3α,21-dihydroxy-11,20-diketo-18, 18-dimethoxy-pregnane; treatment of this compound with N-bromoacetamide followed by acetylation of the resulting reaction product with acetic anhydride in the presence of pyridine, reaction of the acetylated product with bromine, and the treatment of the resulting brominated product with semicarbazide affords Δ⁴-3,11,20-triketo 18,18- dimethoxy-21-acetoxy-pregnane-3,20 - bissemicarbazone, reduction of this product with sodium borohydride, and hydrolysis of this reduced product with pyruvic acid affords aldosterone 21-monoacetate.

The Δ² - 1 - carboxypropyl-2,4b-dimethyl-4-keto-7α-hydroxy - 4aα,8aβ,10aβ - dodecahydrophenanthrene can be converted to the corresponding 1-carboxyethyl compound by the Barbier-Wieland method, and the product so obtained can be converted to aldosterone 21-monoacetate by the procedures described above.

The following examples are presented to illustrate the methods of preparing the new compounds of the present invention.

EXAMPLE 1

*Preparation of Δ²-1-carboxyethyl-2,4b-dimethyl-4-keto-7α-hydroxy 4aα,8aβ,10aβ-dodecahydrophenanthrene from 3α-hydroxy-11-keto-etiochololactone*

To 0.5 g. of 3α-hydroxy-11-keto etiocholactone in 10 ml. of refluxing methanol was added over the course of one hour 5.2 ml. of 0.27 N methanolic sodium methoxide. Removal of the methanol in vacuo and addition of ether afforded the sodium salt of Δ²-1-carboxyethyl-2,4b-dimethyl - 4 - keto-7α-hydroxy-4aα,8aβ,10aβ-dodecahydrophenanthrene which was filtered, washed with ether and dissolved in a few ml of water. Addition of dilute hydrochloric acid followed by ether extraction in the usual way gave the crystalline unsaturated acid which was recrystallized from acetone petroleum ether; glistening plates 350 mg., M.P. 178–9°; 50 mg., M.P. 174–6°; corrected yield, 89%. Further recrystallization did not raise the M.P. above 178–9°; $[\alpha]_D -32.4°$ (C=0.79)

$\lambda_{max}^{CH_3OH}$ 237 m$\mu$, $\epsilon = 12,100$; $\lambda_{max}^{Nujol}$ 3–4, 5.87, 6.00, 6.12$\mu$

*Analysis.*—Calcd. for $C_{19}H_{28}O_4$: C, 71.23; H, 8.81. Found: C, 70.57; H, 8.79.

*Preparation of 3α-hydroxy-11-keto-etiochololactone*

The starting material used in the foregoing example can be prepared from 3α-acetoxy-11,20-diketo-17α-hydroxy-pregnane as follows:

To a solution of 3α-acetoxy-11,20-diketo-17α-hydroxy pregnane, M.P. 202–5° C. (60 g.) in acetic acid (600 ml.) was added chromic oxide (11.3 g.; equivalent ratio 1.1:1) in water (5 ml.) and acetic acid (100 ml.). After three days at 25° C. the solvent was removed in vacuo, water added and the product extracted with ethyl acetate. The organic solution was washed with 5% aqueous sodium carbonate and water and dried over anhydrous magnesium sulfate. The residue remaining after removal of the solvent was dissolved in 2:1 petroleum ether-benzene (1200 ml.) and chromatographed on acid-washed alumina (500 g.). The column was eluted with petroleum ether-benzene, benzene and benzene-chloroform mixtures. From the petroleum ether-benzene fractions there was obtained 3α-acetoxy-11,17-diketo etiocholane; 21.5 g., M.P. 159–161° C. and 6.5 g., M.P. 156–9° C.

3α-acetoxy-11,17-diketo etiocholane (14.0 g.) was dissolved in a solution of sodium hydroxide (12.0 g.) in 50% methanol (240 ml.). After 30 minutes at 25° C. acetic acid (18 ml.) was added, the mixture was concentrated to 150 ml. and water (300 ml.) was added. The precipitated 3α-hydroxy - 11,17 - diketo-etiocholane was filtered, washed several times with water and dried in vacuo; 12.2 g., M.P. 186–8° C.

To a solution of 3α-hydroxy-11,17-diketo-etiocholane (I) (15.0 g.) in benzene (225 ml.) was added perbenzoic acid in benzene (100 ml., 0.32 M). After 48 hours at room temperature the mixture was concentrated in vacuo to a thick slurry, triturated with ether (75 ml.); filtered and washed with ether. Crystallization from acetone-ether gave 3α - hydroxy - 11-keto-etiochololactone as massive prisms 7.3 g., M.P. 212–8° C., 3.4 g. M.P.

202–6° C. (75%). Recrystallization from acetone-petroleum ether raised the melting point to 216–220° C.; [α]$_D$ —12° (C=1.08);

$$\lambda_{max.}^{CHCl_3} \ 2.92, \ 5.80, \ 5.85\mu$$

*Analysis.*—Calcd. for $C_{19}H_{28}O_4$: C, 71.23; H, 8.81. Found: C, 71.65; H, 9.05.

EXAMPLE 2

*Preparation of Δ²-1-carboxyethyl-2,4b-dimethyl-4-keto-7α-hydroxy 4aα,8aβ,10aβ-dodecahydrophenanthrene from 3α-acetoxy-11-keto-etiochololactone*

To a stirred refluxing solution of 3α-acetoxy-11-keto-etiochololactone (100 mg.) in 15 ml. of water was added dropwise over one hour a solution of 5.7 ml. of 0.101 N sodium hydroxide mixed with 10 ml. of methanol. The resulting reaction mixture was concentrated under diminished pressure, diluted with water and traces of neutral material extracted with ether. Acidification of the solution followed by ether extraction and evaporation of the ether extracts afforded crystalline Δ²-1-carboxyethyl-2,4b-dimethyl - 4 - keto - 7α-hydroxy - 4aα,8aβ,-10aβ-dodecahydrophenanthrene melting at 176–178° C.

*Preparation of 3α-acetoxy-11-keto-etiochololactone*

The starting material used in the foregoing example is prepared from 3α-acetoxy-11,17-diketo-etiocholane as follows:

To a solution of 3α-acetoxy-11,17-diketo-etiocholane (1.73 g.) in 5 ml. of acetic acid was added a solution of peracetic acid in acetic acid (4.8 ml., 1.25 M), and the colorless mixture was kept at 25° C. for 24 hours. Slow addition of 100 ml. of cold water precipitated 3α-acetoxy-11-keto-etiochololactone in the form of elongated prisms melting at 181–184° C.; [α]$_D$+14° (C=0.77);

$$\lambda_{max.}^{CHCl_3} \ 5.78, \ 5.86\mu$$

*Analysis.*—calcd. for $C_{21}H_{30}O_5$: C, 69.58; H, 8.34. Found: C, 69.24; H, 8.10.

EXAMPLE 3

*Preparation of Δ²-1-carboxypropyl-2,4b-dimethyl-4-keto-7α-hydroxy - 4aα,8aβ,10aβ - dodecahydrophenanthrene from 3α-acetoxy-11-keto-D-homoetiochololactone*

A solution of 3α-acetoxy-11-keto-D-homoetiochololactone (188 mg.) in methanol (20 ml.) and aqueous 1.00 N sodium hydroxide (1.50 ml.) was refluxed one hour under nitrogen. Acetic acid (0.5 ml.) was added, the solvent removed in vacuo and the acidic product extracted into ether and worked up in the usual way. It crystallized spontaneously on removal of solvent and was recrystallized several times from acetone-ether; matted needles, M.P. 164–6° C.; [α]$_D$—27° (C=0.78);

$$\lambda_{max.}^{CH_3OH} \ 237.5 \ m\mu, \ \epsilon \ 12,500; \ \lambda_{max.}^{CHCl_3} \ 3-4, \ 5.85, \ 6.00, \ 6.18\mu$$

*Analysis.*—Calcd. for $C_{20}H_{30}O_4$: C, 71.81; H, 9.04. Found: C, 71.70; H, 8.79.

EXAMPLE 4

*Preparation of 3α-acetoxy-11-keto-D - homoetiochololactone from 3α,17α,dihydroxy-11,20-diketo - 21 - acetoxy pregnane*

The starting material used in Example 3 is prepared from 3α-17α-dihydroxy-11,20-diketo-21-acetoxy pregnane as follows:

A solution of 6 g. of 3α,17α-dihydroxy-11,20-diketo-21-acetoxy pregnane in 600 ml. of tetrahydrofuran was reduced with 6 g. of lithium aluminum hydride. Addition was effected at room temperature after which the reaction mixture was refluxed for 1½ hours. The excess lithium aluminum hydride was decomposed with ethyl acetate followed by 200 ml. of a saturated solution of sodium sulfate and 200 g. of magnesium sulfate. The reaction mixture was filtered and the filtrate evaporated to give 6 g. of 3α,11,17α,20,21-pentahydroxy pregnane.

The crude pentol (6 g.) in 250 ml. of dioxane was treated with 3.72 g. of periodic acid (H$_5$IO$_6$) in 70 ml. of water and the reaction solution allowed to stand for 4 hours. At the end of this period the reaction mixture was evaporated to near-dryness, the residue extracted with ether and the ether extract washed with water and evaporated to an oil. This oil was dissolved in 100 ml. of methanol and treated with 2.5 g. of hydroxylamine hydrochloride and 3 g. of sodium acetate in 10 ml. of water, heated to boiling on a water bath and allowed to stand overnight at room temperature. The reaction mixture from the oximation was evaporated nearly to dryness, the residue dissolved in ether and the oxime 3α,17α-dihydroxy-11-keto-20-oximino-21-nor-pregnane extracted with 10% aqueous sodium hydroxide. Acidification of the alkaline extracts with hydrochloric acid deposited the crude oxime as a gum. The latter was taken up in ether-ethyl acetate, dried over magnesium sulfate and evaporated to give 3.8 g. of the oxime as an amorphous residue.

A solution of 2.8 g. of the above oxime in 50 cc. of acetic acid was hydrogenated at atmospheric pressure and room temperature using 280 mg. of platinum oxide. The uptake of hydrogen was rapid and conformed to essentially 1 mole. The catalyst was filtered off and the filtrate containing the 3α,17α-dihydroxy-11-keto-20-amino-21-norpregnane made ca. 50% with water, then treated dropwise at 0° C. with a solution of 1 g. of sodium nitrite in 30 ml. of water. The reaction product, which had largely separated (1.6 g.) during the overnight reaction period, was acetylated with acetic anhydride and pyridine followed by chromic acid oxidation and chromatographed over acid washed alumina. From the 1–2% ether in benzene eluates was obtained 340 mg. of 3α - acetoxy - 11,17α - diketo - D-homoetiocholane, M.P. 164.5–165.5° C. The 10% ether-benzene eluates yielded 50 mg. of 3α-acetoxy-11,17-diketo-D-homoetiocholane, M.P. 203–6° C.

3α - acetoxy - 11,17α - diketo-D-homoetiocholane (1.08 g.) in benzene (14 ml.) was mixed with perbenzoic acid in benzene (19.2 ml., 0.391 M). After 3 days at 25° the remaining per acid was destroyed and the reaction mixture worked up by addition of water and ether extraction. The product 3α-acetoxy-11-keto-D-homoetiochololactone was crystallized from ether; 760 mg., M.P. 170–2° C.; 102 mg., M.P. 163.6° C. Recrystallization from ether-petroleum ether gave plates M.P. 172–4° C.; [α]$_D$—24° (C=0.77);

$$\lambda_{max.}^{CHCl_3} \ 5.80, \ 5.85\mu$$

*Aanalysis.*—Calcd. for $C_{22}H_{32}O_5$: C, 70.18; H, 8:57. Found: C, 69.78; H, 8.31.

EXAMPLE 5

*Preparation of 3α-acetoxy-11-keto-D-homoetiochololactone from 3α-acetoxy-11,17-diketoetiocholane*

3α-acetoxy-11,17-diketoetiocholane (5 g.) in 150 cc. of ethanol was cooled to 0° and treated with 30 g. of potassium cyanide, followed by dropwise addition of 34 ml. of glacial acetic acid at such a rate that the temperature did not exceed 5–8° C. After the completion of addition of acetic acid the reaction mixture was allowed to stir at 0° C. for one hour and at room temperature for two hours. At the end of this digestion period the reaction mixture was added to 5 volumes of water and the precipitated oily product extracted with ethyl acetate. The ethyl acetate extract was washed with water, dried over magnesium sulfate and concentrated in vacuo to an oil. The oily 3α,17-dihydroxy-11-keto-17-cyanoetiocholane was acetylated at room temperature for 15 hours with 25 cc. of pyridine and 10 cc. of acetic anhydride. The acetylation reaction product was treated with excess ice-water and the product extracted with ethyl acetate. The ethyl acetate solution was washed with dilute aqueous HCl and NaHCO₃ solution, dried over magnesium sulfate, concentrated and crystallized from ethyl acetate-petroleum ether to produce 3α,17β-diacetoxy-11-keto-17α-cyano-etiocholane M.P. 183–5° C.

A solution of two grams of this cyanohydrin acetate was dissolved in 50 cc. of benzene and treated with 2 g. of lithium aluminum hydride in 250 cc. of ether. The reaction mixture was refluxed for 1 hour and then the excess lithium aluminum hydride cautiously decomposed with water. The solid was filtered, dried in a vacuum desiccator and then extracted with acetone in a Soxhlet extractor for 5–6 hours. Evaporation of the acetone left an oil. The latter was taken up in ether and extracted with dilute HCl. Neutralization of the HCl extract deposited the oxazolidine derivative of 3α,11β,17β-trihydroxy-20-amino-21-norpregnane which was crystallized from ethyl acetate petroleum ether, melting at 190–192° C.

Analysis.—Calcd. for $C_{23}H_{39}O_3N$: C, 73.20; H, 10.32; N, 3.72. Found: C. 73.45; H, 10.29; H, 3.73.

A solution of 1 g. of the above amine in 95 ml. of 5% aqueous acetic acid was chilled to 0° C. and treated with a solution of 0.35 g. of sodium nitrite in 8 cc. of water. The reaction mixture was allowed to stand 3 hours at 0° C. and overnight at room temperature. During this period 0.6–0.7 g. of solid product separated. The latter was acetylated with 4 ml. of pyridine and 2 ml. of acetic anhydride at room temperature overnight followed by oxidation in 5 ml. of acetic acid containing 130 mg. of chromic acid. Chromatography of the product on acid-washed alumina yielded from eluates of 1–5% ether in benzene, 340 mg. of 3α-acetoxy-11,17α-diketo-D-homoetiocholane as needles from acetone-petroleum ether, M.P. 167–8° C.; [α]_D+28.7° (C=1.02).

Analysis.—Calcd. for $C_{22}H_{32}O_4$: C, 73.33; H, 8.88. Found: C, 73.50; H, 8.77.

2,4-dinitrophenylhydrazone crystallized as yellow needles from methanol-ethyl acetate, M.P. 220–225° C.

Analysis.—Calcd. for $C_{28}H_{36}O_7N_4$: N, 10.37. Found: N, 10.48.

The eluates from the chromatography consisting of 10–20% ether in benzene yielded 52 mg. of 3α-acetoxy-11,17-diketo-D-homoetiocholane as plates from acetone-ether, M.P. 205–7° C.; [α]_D+23.0° (C=1.09).

Analysis.—Calcd. for $C_{22}H_{32}O_4$: C, 73.33; H, 8.88. Found: C, 73.29; H, 8.91.

2,4-dinitrophenylhydrazone crystallized as needles from methanol-ethyl acetate, M.P. 281–3°.

Analysis.—Calcd. for $C_{28}H_{36}O_7N_4$: N, 10.37. Found: N, 10.54.

The 3α-acetoxy-11,17α-diketo-D-homoetiocholane was then treated following the method described in Example 4 to obtain 3α-acetoxy-11,17α-diketo-D-homoetiochololactone.

Various changes and modifications of the invention can be made and, to the extent that such variations incorporate the spirit of this invention, they are intended to be included within the scope of the appended claims.

I claim:

1. The process which comprises reacting a compound having the structural formula

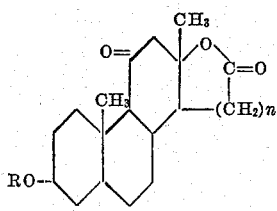

wherein $n$ is an integer greater than 1 and less than 4 and R is a member from the group consisting of hydrogen and lower fatty acid radicals, with a base to produce a compound having the structure

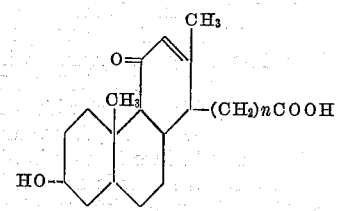

wherein $n$ is the same as defined above.

2. The process which comprises reacting 3α-hydroxy-11-keto-etiochololactone with an inorganic base to produce $\Delta^2$-1-carboxy-ethyl-2,4bβ-dimethyl-4-keto-7α-hydroxy-4aα,8aβ,10aβ-dodecahydrophenanthrene.

3. The process which comprises reacting 3α-acyloxy-11-keto-etiochololactone wherein the acyl group is a lower fatty acid radical with an inorganic base to produce $\Delta^2$-1-carboxyethyl-2,4bβ-dimethyl-4-keto-7α-hydroxy-4aα,8aβ,10aβ-dodecahydrophenanthrene.

4. The process which comprises reacting 3α-hydroxy-11-keto-D-homoetiochololactone with an inorganic base to produce $\Delta^2$-1-carboxypropyl-2,4bβ-dimethyl-4-keto-7α-hydroxy-4aα,8aβ,10aβ-dodecahydrophenanthrene.

5. The process which comprises reacting 3α-acyloxy-11-keto-D-homoetiochololactone wherein the acyl group is a lower fatty acid radical with an inorganic base to produce $\Delta^2$-1-carboxypropyl-2,4bβ-dimethyl-4-keto-7α-hydroxy-4aα,8aβ,10aβ-dodecahydrophenanthrene.

6. The process which comprises reacting 3α-hydroxy-11,17-diketo-etiocholane with an organic per acid to produce 3α-hydroxy-11-keto-etiochololactone, and treating said lactone with a base to obtain $\Delta^2$-1-carboxyethyl-2,4bβ-dimethyl-4-keto-7α-hydroxy-4aα,8aβ,10aβ-dodecahydrophenanthrene.

7. The process which comprises reacting 3α-hydroxy-11,17-diketo-etiocholane with perbenzoic acid in benzene to produce 3α-hydroxy-11-keto-etiochololactone, and heating said lactone with sodium methoxide in methanol to obtain $\Delta^2$-1-carboxyethyl-2,4bβ-dimethyl-4-keto-7α-hydroxy-4aα,8aβ,10aβ-dodecahydrophenanthrene.

8. The process which comprises reacting 3α-acyloxy-11,17-diketo-etiocholane with hydrogen cyanide to form 3α,17β-dihydroxy-11-keto-17α-cyano-etiocholane; acylating the latter product to form the corresponding 3,17-diacyloxy derivative, reducing this diacyloxy compound with lithium aluminum hydride and treating the reduced product with acetone to form the oxazolidine derivative of 3α,11β,17β-trihydroxy-20-amino-21-norpregnane, diazotizing said oxazolidine derivative, acylating the diazotized product, oxidizing said acylated product to produce 3α-acyloxy-11,17α-diketo-D-homoetiocholane, oxidizing this product with an organic per acid to obtain 3α-acyloxy-11-keto-D-homoetiochololactone, and treating this lactone with a base to produce $\Delta^2$-1-carboxypropyl-2,4bβ-dimethyl-4-keto-7α-hydroxy-4aα,8aβ,10aβ-dodecahydrophenanthrene.

9. The process which comprises reacting 3α-acetoxy-11,17-diketo-etiocholane with potassium cyanide in the presence of acetic acid to form 3α,17β-dihydroxy-11-keto-17α-cyanoetiocholane, treating this product with acetic anhydride in the presence of pyridine to obtain the corresponding 3,17-diacyloxy derivative, reducing this diacyloxy compound with lithium aluminum hydride and treating the reduced product with acetone to produce the oxazolidine derivative of 3α,11β,17β-trihydroxy-20-amino-21-norpregnane, reacting said oxazolidine derivative with sodium nitrite in the presence of acetic acid, acylating the resulting product with acetic anhydride in the presence of pyridine, reacting the resulting product with chromic acid in acetic acid to produce 3α-acetoxy-11,17α-diketo-D-homoetiocholane, oxidizing this product by reaction with perbenzoic acid to obtain 3α-acetoxy-11-keto-D-homoetiochololactone, and heating this product with sodium hydroxide in methanol to produce $\Delta^2$-1-carboxypropyl - 2,4b$\beta$ - dimethyl - 4 - keto - 7$\alpha$ - hydroxy-4a$\alpha$,8a$\beta$,10a$\beta$-dodecahydrophenanthrene.

10. The process which comprises reacting 3$\alpha$,17$\alpha$-dihydroxy-11,20-diketo-21-acetoxy pregnane with lithium aluminum hydride to produce 3$\alpha$,11,17$\alpha$,20,21-pentahydroxy pregnane, reacting this product with periodic acid, treating the resulting product with hydroxylamine to produce 3$\alpha$,17$\alpha$ - dihydroxy-11-keto-20-oximino-21-norpregnane, reducing this product in acetic acid with hydrogen in the presence of platinum catalyst to obtain 3$\alpha$,17$\alpha$-dihydroxy-11-keto-20-amino-21-norpregnane, reacting this product with sodium nitrite, treating the resulting reaction product with acetic anhydride in the presence of pyridine followed by chromic acid-acetic acid oxidation to obtain 3$\alpha$ - acetoxy-11,17$\alpha$-diketo-D-homoetiocholane, oxidizing this product by reaction with perbenzoic acid to obtain 3$\alpha$-acetoxy-11-keto-D-homoetiocholololactone, and heating this product with sodium hydroxide in methanol to produce $\Delta^2$ - 1 - carboxypropyl-2,4b$\beta$-dimethyl-4-keto-7$\alpha$-hydroxy-4a$\alpha$,8a$\beta$,10a$\beta$-dodecahydrophenanthrene.

References Cited in the file of this patent

UNITED STATES PATENTS 2,889,355  Ruzicka et al. _____ June 2, 1959